March 12, 1968     R. GÖTZENBERGER     3,372,902
VALVE, ESPECIALLY EXPANSION VALVE FOR REFRIGERATOR
Filed Dec. 3, 1965
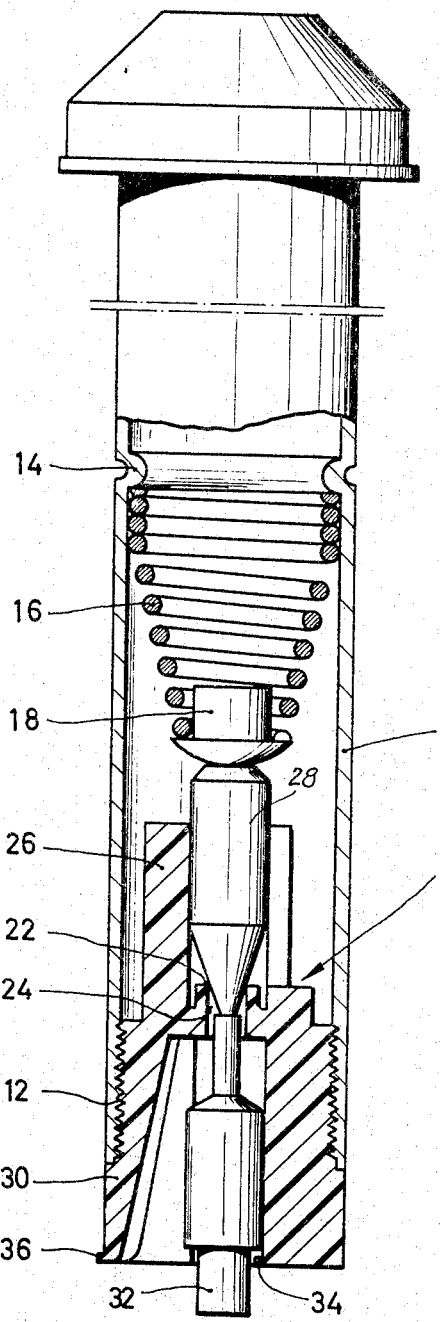
Inventor:
Radibert Götzenberger
by Michael S. Striker

United States Patent Office 3,372,902
Patented Mar. 12, 1968

3,372,902
VALVE, ESPECIALLY EXPANSION VALVE FOR REFRIGERATOR
Rudibert Götzenberger, Fellbach, near Stuttgart, Germany, assignor to Firma Ernst Flitsch, Fellbach, near Stuttgart, Germany
Filed Dec. 3, 1965, Ser. No. 511,888
Claims priority, application Germany, Dec. 12, 1964, F 44,695
6 Claims. (Cl. 251—321)

ABSTRACT OF THE DISCLOSURE

An expansion valve for refrigerators in which a spring pressed valve member is engaged at one end by a coaxial pin member to be moved by the latter against the spring force out of engagement with the valve seat and in which the valve member and the pin member are guided by guide means for movement in axial direction.

---

The present invention relates to a valve, and especially to an expansion valve for refrigerators, which includes a valve body formed with a valve seat for a valve needle which is guided in axial direction by first guide means for movement toward and away from the valve seat and which is under the influence of resilient means biased so as to tend to move the valve needle into engagement with the valve seat. The valve includes further a pin movable in axial direction and engaging with one end thereof the valve needle for moving the latter away from the valve seat and this pin is guided for movement in axial direction in a second guide means.

In known valve arrangements of this kind the valve body is screwed in or otherwise connected to a socket or housing and the valve needle is mounted in a metallic holder. Since it is essential for the proper functioning of the valve that the valve needle is arranged coaxial with the bore through the valve body at one end of which the valve seat is formed and is guided properly in axial direction, it is necesssary in the known arrangements to exactly machine the circumferential surface of the holder of the valve needle and also to exactly machine the parts of the housing guiding the holder of the valve needle and to assemble the parts in such a manner that the guide portions of the housing are exactly coaxial with the valve seat. In addition it is necessary to provide for an additional guide body for the pressure pin connected to the housing, for instance by a screw connection, and which has also to be exactly machined for guiding the pressure pin in axial direction.

It is an object of the present invention to provide for a valve of the aforementioned kind which differs by its unobvious simplicity from valve arrangements of this kind known in the art.

It is an additional object of the present invention to provide for a valve of the aforementioned kind which is composed of relatively few and simple parts so that the valve can be manufactured at reasonable cost and will stand up trouble free under extended use.

With these objects in view, the valve of the present invention, especially an expansion valve for refrigerators, mainly comprises a valve body formed with an axial bore therethrough forming a valve seat at one end of the bore, an elongated valve member coaxial with the bore and movable in axial direction into and out of engagement with the valve seat, resilient means engaging the valve member and biased so as to urge the latter into engagement with the valve seat, a pin member extending with clearance through the bore and engaging the valve member and being movable in axial direction for moving the valve members against the force of the resilient means out of engagement with the valve seat, first guide means engaging the valve member for guiding the same in axial direction, and second guide means engaging the pin member for guiding the same in axial direction, wherein the valve body, the first and second guide means are integrally made with each other. Preferably, the valve body, the first and the second guide means are integrally diecast from plastic material.

Since a valve body made from plastic material has been proven as especially advantageous due to the good sliding qualities of the surfaces thereof, the arrangement according to the present invention is especially advantageous since it provides also for a perfect low friction guiding of the valve member and the pressure pin. In addition to the manufacturing advantage resulting from the integral formation of the valve body and the first and the second guide means, the valve according to the present invention will also greatly simplify the mounting of the valve unit. Furthermore, the valve of the present invention permits also to obtain in a very simple manner an exact guiding of the valve needle and the pressure pin coaxial with the valve seat. Finally, the integral diecasting of the valve body and the first and the second guide means permits also to provide at the inlet and outlet end of the valve better flow conditions as have been obtainable with valves of this kind known in the art.

In order to prevent clogging of the valve by dirt particles which may, despite provision of filters in the refrigerator, penetrate into the valve, it is especially advantageous to provide three guide faces for the valve needle which form tangential planes to the peripheral surface of the needle, and for the same reason it is also advantageous to provide three guide faces for the pressure pin arranged as tangential planes to the peripheral surface of the pin. Any dirt particles penetrating the thus constructed valve will be easily flushed away by the fluid passing therethrough.

In many cases it is also desirable that the valve may be assembled with and disassembled from the refrigerator as a unit and that during such assembly or disassembly the components forming the valve unit will be properly retained therein. For this purpose it is advantageous to provide on at least one of the guide faces for the pressure pin, respectively on one of the guide faces for the valve needle stop means, for instance in the form of an inwardly projecting nose which is adapted to engage with a shoulder or the like of the pressure pin, respectively the valve needle, preventing thereby dropping of the pressure pin or the valve needle out of the valve unit when the latter is disassembled from the refrigerator. It is also advantageous to provide on the periphery of the valve body at least one outwardly projecting nose for securing the valve body to the apparatus on which it is used, in which the drawing is a partially sectioned side view of the valve according to the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the drawing is a partially sectioned side view of the valve according to the present invention.

Referring now to the drawing, it will be seen that the valve according to the present invention mainly comprises a valve body 20 formed with an axial bore 24 therethrough forming at one end, shown in the drawing as the upper end, a valve seat 22. Coaxially arranged with the bore 24 is a needle valve member 28 having an upper, substantially cylindrical portion and a lower, substantially frustoconical portion engaging in the position shown the valve seat 22. The valve needle 28 is guided for movement in axial direction toward and away from the valve seat 22 by first guide means 26 preferably including three guide portions projecting upwardly from the valve body 20 integral therewith and being circumferentially displaced through angles of 120° and each having a plane guide face forming a tangential plane engaging the peripheral surface of the valve needle 28. The guide faces of the guide portions 26 are preferably arranged to include angles of 60° with each other. A tubular housing or socket 10 is threadedly connected at the lower end thereof to an outer screw thread 12 provided at the lower portion of the valve body 20 and a coil spring 16, in the lower, preferably tapering, end of which a pressure member 18 is arranged, is located in the housing 10 engaging with the upper end thereof an inwardly extending annular corrugation 14 formed in the housing 10 intermediate its ends. The coil spring 16 is biased to press the pressure member 18 against the upper end of the valve needle 28 and thereby the conical portion of the latter into engagement of the valve seat 22. A pin member 32 movable in axial direction by means not shown in the drawing has an upper portion of reduced diameter which extends with ample clearance through the bore 24 to engage with the upper end thereof the lower end of the conical portion of the valve member 28 to move the latter against the pressure of the coil spring 16 away from the valve seat 22. The pin member is guided for movement in axial direction by three guide portions 30 likewise integrally formed with the valve body and circumferentially displaced through 120° from each other and each having preferably a guide face forming a plane tangential to the peripheral surface of the large diameter portion of the pin 32. The lower end of the pin member 32 projecting beyond the valve body 20, respectively the guide portions 30, has preferably also a reduced diameter so as to form a transverse shoulder at the bottom end of the large diameter portion of the pin and a stop means in the form of a nose 34 projecting inwardly from one of the guide portions 30 is adapted to engage the aforementioned shoulder for limiting downward movement of the pin 32 and preventing the pin from falling out of the valve unit when the latter is disassembled from the refrigerator or other apparatus on which it is used. An additional nose 36 projecting outwardly from one of the portions 30 is also preferably provided for securing the valve unit to a refrigerator or similar apparatus.

The valve body 20 and the first guide means constituted by the guide portions 26 as well as the second guide means constituted by the guide portions 30 are integral with each other and preferably these components are integrally diecast from plastic material providing surfaces with a low friction coefficient so as to provide for a guiding of the valve needle and the pressure pin with a minimum of friction.

It will be understood that each of the elements described above, or two or more together, may also find a useful application in other types of valves differing from the type described above.

While the invention has been illustrated and described as embodied in a valve, especially an expansion valve for refrigerators or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A valve, especially an expansion valve for refrigerators, comprising, in combination, a valve body formed with an axial bore therethrough forming a valve seat at one end of said bore;

an elongated one piece valve member coaxial with said bore and having a cylindrical portion and a frustoconical end portion movable in axial direction into and out of engagement with said valve seat;

resilient means engaging said valve member and biased so as to urge the latter into engagement with said valve seat;

a pin member extending with clearance through said bore and engaging said end portion of said valve member, said pin member being movable in axial direction for moving said valve member against the force of said resilient means out of engagement with said valve seat;

first guide means engaging said valve member for guiding the same in axial direction and including three guide portions and respectively having plane guide faces tangential to the peripheral surface of said cylindrical portion of said valve member and being uniformly displaced from each other about the axis of said valve member;

and second guide means engaging said pin member for guiding the same in axial direction and likewise including three guide portions respectively having plane guide faces tangential to the peripheral surface of said pin member and being uniformly displaced from each other about the axis of said pin member, said first and second guide means being integral with said valve body and engaging said valve member and said pin member, respectively, only with line contacts between said plane guide faces and the peripheral surfaces of said members.

2. A valve as set forth in claim 1, wherein said valve body, said first and said second guide means are integrally diecast from plastic material.

3. A valve as set forth in claim 1, and including stop means integral with one of said guide means and adapted to engage one of said members for limiting axial movement thereof.

4. A valve as set forth in claim 1, and including stop means for limiting movement of said pin member away from said valve seat, said stop means comprising a nose projecting inwardly from one of said guide portions of said second guide means and adapted to engage a shoulder of said pin member.

5. A valve as set forth in claim 1, and including at least one nose projecting outwardly from said valve body for securing the latter.

6. A valve as set forth in claim 1, wherein said resilient means is in the form of a coil spring arranged substantially coaxial with said valve member and connected at one end thereof to the end of said valve member distant from said valve seat, and including a tubular housing surrounding said spring and engaging the other end thereof, said housing being connected at one end thereof to said valve body,

References Cited

UNITED STATES PATENTS

| | | | |
|---|---|---|---|
| 591,012 | 10/1897 | Schrader | 251—321 X |
| 724,128 | 3/1903 | Schrader | 251—323 X |
| 1,177,299 | 3/1916 | Borden | 251—339 X |
| 3,006,558 | 10/1961 | Jacobs | 251—368 X |

M. CARY NELSON, *Primary Examiner.*

ARNOLD ROSENTHAL, *Examiner.*